Nov. 15, 1949 W. K. SONNEMANN 2,488,443
VANE TYPE ALTERNATING CURRENT RELAY
Filed Jan. 15, 1946 2 Sheets-Sheet 1

WITNESSES:

INVENTOR
William K. Sonnemann.
BY
ATTORNEY

Nov. 15, 1949 W. K. SONNEMANN 2,488,443
VANE TYPE ALTERNATING CURRENT RELAY
Filed Jan. 15, 1946 2 Sheets-Sheet 2

WITNESSES:

INVENTOR
William K. Sonnemann,
BY
ATTORNEY

Patented Nov. 15, 1949

2,488,443

UNITED STATES PATENT OFFICE 2,488,443

VANE TYPE ALTERNATING CURRENT RELAY

William K. Sonnemann, Roselle Park, N. J., assignor to Westinghouse Electric Corporation, East Pittsburgh, Pa., a corporation of Pennsylvania Application January 15, 1946, Serial No. 641,331

8 Claims. (Cl. 175—338)

My present invention relates to improvements in alternating-current relay-elements or electro-responsive devices which operate on the induction principle of utilizing two alternating fluxes to induce eddy currents in a flat conducting segment, and to thereby produce a motivating force, on that segment, through interaction of the fluxes with the eddy currents induced in the segment by said fluxes.

One of the objects of my present invention is to produce an improved high-speed relay-element in which the size of the moving element is only slightly larger than the area of flux-carrying pole-faces, so that the weight or inertia of the moving element is reduced very nearly to the weight or inertia of the exact amount of conducting material which is required in order to carry the eddy currents which produce the relay-actuating force. With this construction, the ratio of force to mass of the moving element is a maximum, and hence the operating speed is a maximum. In a preferred form of embodiment of my invention, the moving element is a sheetlike conducting member which is supported so as to have only an approximately translational motion in approximately its own plane, two different supporting-means being shown to this end.

Further objects of my invention include the provision of movable-element supporting-means having a gravity resetting-force on the movable element, and stop-means for adjusting the relations between the non-energized position of the movable element, the gravity reset-position thereof, and the dead center of the decentering force which is developed in the movable element when only the center pole of a tripolar field-member is energized. This decentering force thus becomes a useful feature of my invention, as distinguished from certain other relay-designs in which the corresponding force is a centering force, rather than a decentering force. When the central pole of the tripolar field-structure is the only pole carrying flux, the portion of this flux which interlinks with the sheetlike conducting member or movable element of the relay produces eddy currents in said movable element, and these eddy currents have leakage-fluxes which react with the leakage fluxes of the exciting-coil on the central field-pole, to produce a repulsive force which tends to push the movable element out from under the central pole, once said element has been displaced from its dead-center position. By suitably correlating the stop-adjustment, and the gravity reset feature (when used), with this decentering force, and by energizing the central pole in response to the line-current, and the two outer poles in response to the line-voltage or potential, a directional response is obtained, in which the decentering force aids the relay-response in the event of a dead short-circuit on the line, which reduces the line-voltage to a very small amount.

A further object of my invention is to provide apparatus of the type in question, in which magnetic reluctance-adjusting means are provided for controlling the stray torques of an E-shaped tripolar electromagnet field-element.

With the foregoing and other objects in view, my invention consists of the circuits, systems, apparatus, combinations, methods and parts hereinafter described and claimed, and illustrated in the accompanying drawing, wherein:

Figure 1:
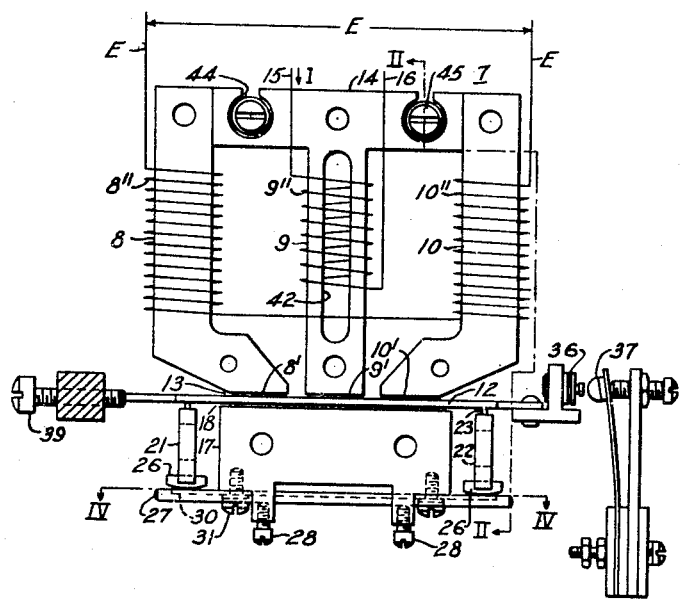
Figure 1 is a somewhat diagrammatic front elevational view of a relay embodying my invention.

At the top of the alternating-current relay-element which is shown in Fig. 1, is an E-shaped tripolar electromagnet field-element 7, having its three pole-pieces 8, 9 and 10 projecting downwardly, and terminating in pole-face portions 8', 9' and 10', respectively. The three pole-face portions 8', 9' and 10' are disposed in a straight line, spaced from each other in a horizontal plane, which is disposed immediately above the top surface of the horizontally disposed movable plate 12 of the relay, being separated therefrom by a small air-gap 13. The tripolar field-element is made of laminated magnetizable material. The movable plate 12 is a sheet-like conducting member, which may be made of copper or aluminum or other conducting material, and it is only slightly larger than is necessary for its top surface to be covered by the three pole-faces 8', 9' and 10', so that a substantial part of the whole area of the moving plate 12 is useful torque-producing material, as will be subsequently pointed out.

The field-element 7 is excited by means of exciting coils 8'', 9'' and 10'', placed on the respective pole-pieces 8, 9 and 10. The coils 8'' and 10'', on the two outer poles, are energized from the same electrical circuit, usually being connected in series with each other, and usually being connected in a potential or voltage-energized circuit E, which is impressed with the line-voltage E, as indicated. The magnetic flux of these potential coils 8'' and 10'', at any instant, is up one of the outer pole-pieces, across the laminated magnetizable yoke 14, and down the other outer pole-piece. The exciting coil 9'', which is disposed on the center pole-piece 9, is energized from a second single-phase exciting-circuit 15—16, which may be energized, with currents out of phase with the potential-energized currents, from any exciting source, such as the line-current I as indicated by the arrow.

Usually, it is desirable for another magnetizable field-element to be disposed underneath the movable plate 12, and this lower field-element may be either a duplicate of the upper field-element, or a different kind of field-element, either excited or unexcited. In the particular form of my invention which is shown in Fig. 1, the lower field-element is shown in the form of a magnetizable block 17, which acts as a magnetic keeper, at the same time also acting as a mechanical support for the supporting means for the movable plate 12, as will be subsequently described. The top surface of the magnetizable block 17 is spaced slightly below the bottom surface of the movable plate 12, so that it is separated therefrom by an air-gap 18, so that the electromagnetically induced flux of the upper field-element 7 can pass across the double air-gaps 13 and 18 and through the thickness of the movable plate 12, so that the lower field-element 17 operates as a return-path for this flux.

While theoretically, for best results, the magnetic keeper 17 should be laminated, it has been found, for practical purposes, that a solid or unlaminated construction of this element is acceptable from the standpoint of electrical performance, probably because most of the energy, which is absorbed by a relay-element of the type described, goes into maintaining or setting up the air-gap flux. A solid or unlaminated construction of the magnetic keeper 17 has mechanical advantages in the structural design, in being more readily drilled and machined to a precise structural shape.

Figure 5:
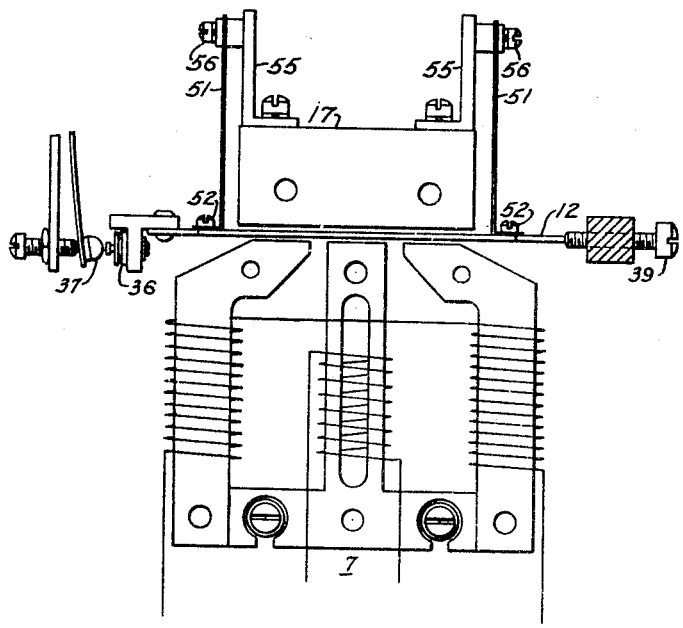
Fig. 5 is a view similar to Fig. 1, showing a modification.

The movable plate 12 is supported with freedom for only approximately translational motion in approximately its own plane, and for only a limited amount of such motion. In the broader aspects of my invention, any plate-supporting means to this end could be utilized, and in its broader aspects, my invention is not limited to any particular kind of means for this purpose. In accordance with a more specific aspect of my invention, however, I have devised two different means for movably supporting the movable plate 12 in such manner that a minimum of friction and a minimum mass or inertia is interposed against such motion, while providing a simple, rugged design which is easily manufactured, readily dismantled for maintenance, and susceptible of the desirable adjustments. Two specific forms of the plate-supporting means are shown in Figs. 1 and 5, respectively.

Figure 3:
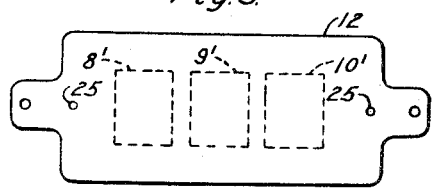
Fig. 3 is a bottom plan view of the moving plate, as indicated by the line III—III in Fig. 2.

In Fig. 1, the movable plate 12 rests on two separate rocker-supporting members 21 and 22, which are disposed transversely with respect to the direction of movement of the movable plate 12, one near each end of said movable plate. Projecting out of the tops of the two rocker-supporting members 21 and 22 are two rounded-surface low-friction pins 23, which bear against the flat undersurface of the movable plate 12, the movable plate being retained in position by means of a tapered locating pin 24, which projects up from the top of each rocker-supporting member and engages loosely in a hole 25 which is provided in the movable plate 12, as shown in Fig. 3.

Each of the two rocker-supporting members 21 and 22 has two rockers 26 underneath the same, one rocker near each end of each rocker-supporting member. The four rockers 26 rest on two parallel stationary rocker-supporting bars 27, which are secured to the magnetic keeper 17 by means of setscrews 28. These rocker-supporting bars 27 extend parallel to the direction of movement of the movable plate 12. The top surfaces of the rocker-supporting bars have such configuration as to approximate a point-contact with each rocker 26, and to this end, the rocker-supporting bars 27 are illustrated, in Figs. 1 and 2, as round rods, of circular cross-section, although I am not limited to this particular construction.

Figure 2:
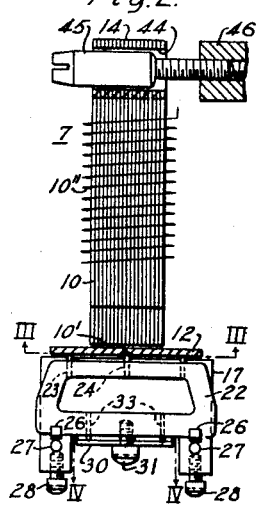
Fig. 2 is an end view thereof, with the contact-mechanism omitted, as indicated by the section-line II—II in Fig. 1.
Figure 4:
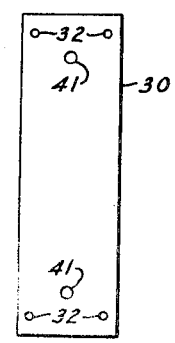
Fig. 4 is a top plan of the locating plate, as indicated by the line IV—IV in Figs. 1 and 2.

To maintain the desired locations of the two rocker-supporting members 21 and 22 on the two rocker-supporting bars 27, I prefer to provide a locating plate 30, which is secured to the bottom of the magnetic keeper 17, by means of retaining-screws 31. The locating plate 30 extends between the two parallel rocker-supporting rods 27, and is provided with a plurality of holes 32, as shown in Fig. 4, for loosely receiving a plurality of downwardly extending, tapered locating-pins 33 which are provided on the rocker-supporting members 21 and 22, as shown in Fig. 2.

Any suitable electric contact-means are provided, which are operable in response to the movement of the movable plate 12. In the particular form of embodiment shown in Fig. 1, the contact-means comprises a movable contact-member 36, which is carried by one end of the movable plate 12, and which makes contact with a stationary contact-member 37.

I also prefer to provide an adjustable stop-means, which is shown in the form of a stop-screw 39 which abuts against the end of the movable plate 12, opposite to the end which carries the contact-member 36. The stop 39 serves to limit the movement of the movable plate 12 in a direction opposite to the normal relay-actuating force which is developed electromagnetically by the energization of the field-element 7, as will be subsequently described. It will be understood, of course, that a duplicate of the contact-mechanism 36, 37 might have been utilized, in place of the adjustable stop-means 39.

In operation, the movable-plate supporting-means operates to support the movable plate 12 with freedom for only approximately translational motion, while at the same time providing a gravity resetting-force which is useful in biasing the movable element toward a certain predetermined non-energized position. Considering the two rocker-supporting members 21 and 22 alone, without the movable plate 12 resting on top of them, it will be noted that these rocker members tend to remain in the vertical position because their centers of gravity are below the center of radius of the curved rocker surface. This provides a gravity biasing or resetting-force which tends to move the movable plate 12 to the position in which the rocker members 21 and 22 are vertical. The magnitude of this gravity resetting-force depends upon the mass and the center of gravity of the rocker-supporting members 21 and 22, and the radius of curvature of the rockers 26.

Sometimes, in extremely sensitive relays, this gravity resetting-force may be larger than is desirable, even when the rocker-supporting members 21 and 22 are made of extremely lightweight material, and of a hollowed-out or skeleton structure as shown in Fig. 2. In such a case, the radius of curvature of the rockers 26 may be shortened so that the center of curvature falls slightly below the undersurface of the movable plate 12, which means that the weight of the movable plate 12 will tend to somewhat counteract the gravity resetting-force of the rocker-elements alone, thus providing a nice adjustment of the gravity resetting-force. On the other hand, if the rocker-radius is sufficient to bring the center of curvature above the center of gravity of the movable plate 12, then the weight of the plate will serve to increase the gravity resetting-force of the rocker elements 21 and 22.

The electrically magnetized or excited field-element 7 is typical of any multipolar alternating-current electromagnetic field-structure in which a force is exerted tending to move the movable plate in its own plane as a result of the interaction of the field-member pole-fluxes with the eddy currents which are induced in the movable plate. The two single-phase energizing-circuits E—E and 15—16 of the field-element may be energized so as to receive any two single-phase magnetizing-currents, which may be produced either in response to line-currents, to line-voltage, a line-current and a line-voltage, or mixtures of the two, as is readily understood in the art.

The particular form of my invention, which is shown in Fig. 1, is a directional element, which is an important field of application of my invention. Such a relay operates by comparing the direction of the line-current I with respect to the line-voltage E, developing a relay-actuating force which is responsive to the product of current and voltage, times a function of the phase-angle between them. When such directional elements are utilized in protective relay systems for protecting transmission-systems against faults, it is commonly desirable to obtain the maximum possible speed of operation, which means the highest possible ratio of the effective operating-force to the inertia of the movable element. It is frequently also desirable to have an extremely high sensitivity, so that the relay will operate when the operating-force is low. Sometimes, the relay is required to respond when the line-voltage drops to only one-half of one per cent of its normal value, while the line-current is, say, four times its full-load normal value. Because of the small value of the voltage, the product of current and voltage will be low, in such an event, and hence the operating-force will be small.

When the operating-force is so small, it is particularly important to consider the stray torques or forces which are produced in the relay, that is, the forces other than the product-responsive operational-force of the relay. These forces may be due to current alone, or to voltage alone, or to magnetic or structural dissymmetry in the relay itself. When only one of the single-phase energizing-circuits of the relay is energized, either the current-circuit or the voltage-circuit, it is well known that forces are frequently exerted upon the movable element of the relay, and an important feature of my invention is the ability to control, and make good use of, these stray forces.

When only the current-responsive energizing-circuit 15—16, is energized, as during times of fault, when the line-current may be, say, four times normal, and the voltage-coils 8'', 10'' may be substantially short-circuited, there is usually a force, in most directional relays, tending to move the movable element either toward or away from an electrical center or dead-center position, depending upon whether the stray force is a centering force or a decentering force. In my relay, it is a decentering force, which I am able to utilize, in a controlled manner, to aid in the fast operation of the relay, which is particularly desirable when the direction-responsive operating-force is very weak, so that this decentering force may be utilized to expedite the relay-response, once the movable element has been moved out of its dead-center position. This decentering force results from the interaction between the leakage-flux of the current-coil 9'' of the field-element and the leakage-flux of the eddy currents which flow in the movable element.

In the operation of my invention, the position of the dead center of the "voltage only" force, resulting from voltage-energization alone, may be controlled by adjustments of the position of the locating-plate 30, which may be adjusted slightly—all that is necessary—by loosening the setscrews 31, which pass through enlarged holes 41 in the locating-plate 30 (Fig. 4). The relative positions of the electrical dead-center and the non-energized position of the movable plate 12 can be adjusted by manipulation of the adjustable stop-screw 39. By these means, I am able to make good, and readily controllable, use of the "voltage only" torque or force which operates on the relay.

The "current only" force which operates on the relay is also controllable, in accordance with my invention. To this end, I provide a hole 44 in each half of the yoke-piece 14 of the field-element 7, so that a restricted magnet cross-section is provided in the portions of the yoke which join the back end of the central pole-piece 9 to each of the outer pole-pieces 8 and 10, respectively. I then provide a magnetic screw-plug 45 which is loosely inserted in each of said holes 44, and which may be screwed into a suitable foundation-piece 46 to a greater or less degree, thus partially filling the holes with magnetic material, with a vernier adjustment which has been found very useful in controlling the forces which are produced by current only, this being a matter of empirical adjustment. The magnitude of the current-responsive decentering force may be limited, if desired, by saturation in the central leg or pole-piece 9 of the field-element, as by providing a slot 42 therein, as indicated in Fig. 1.

Figure 6:
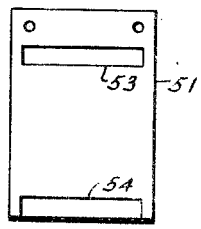
Fig. 6 is an end view of one of the suspending-springs shown in Fig. 5.

In Fig. 5, I have shown an alternative way of movably supporting the movable plate 12, which is here supported on two downwardly depending leaf-springs 51, which are secured to the top face of the movable plate 12, as indicated at 52. These leaf-springs are constructed of extremely thin sheet-material, which is suitably cut out, as indicated at 53 and 54 in Fig. 6, to provide weakened sections which are very flexible in the direction of movement of the movable element 12.

In the form of embodiment of my invention shown in Fig. 5, the magnetic keeper 17 is disposed above the movable plate 12, and the electromagnetic field-element 7 is disposed below the movable plate 12. The keeper 17 is provided with upwardly extending brackets 55, which are adjustably connected to the tops of the suspension-springs 51, as by means of bolts 56.

In both forms of embodiment of my invention, I have simplified the drawings by omitting mounting-details for the stationary parts such as the electromagnet field-element 7, the keeper 17, and the stationary contact-assembly 36. It will be understood, of course, that suitable mounting-means are provided for such parts.

While I have illustrated my invention in two different specific forms of embodiment, I wish it to be understood that such illustration is intended, in its broader aspects, to be representative or symbolic of any suitable means for generically performing the various functions which have been described. I desire, therefore, that the appended claims shall be accorded the broadest construction consistent with their language.

I claim as my invention:

1. An alternating-current electro-responsive device, comprising a flat, sheetlike conducting member, low-inertia means supporting said sheetlike conducting member with freedom for only motion in approximately its own plane, and for only a limited amount of such motion, a movable means mechanically associated with said sheetlike conducting member to be moved therewith, and multipolar field-member means comprising an E-shaped, tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from one face of said sheetlike conducting member, said pole-faces being alined in approximately a straight line in approximately the direction of motion of said sheetlike conducting member and covering a substantial part of the whole area of said sheetlike conducting member, said pole pieces covering a substantial part of the whole area of said sheetlike conducting member; said multipolar field-member means having alternating-current exciting-coil means for moving said sheetlike conducting member through interaction of the field-member pole-fluxes with the eddy currents induced in said sheetlike conducting member, said exciting-coil means including exciting-coil means on the center pole-face and other exciting-coil means for causing mutually aiding flux-flow through said yoke-piece and the two outer pole-pieces, and means in the yoke-piece portion of each of said parallel return-flux paths for independently adjusting the magnetic constants thereof.

2. The invention as defined in claim 1, in combination with stop-means for adjusting the relative positions of the non-energized position of the sheetlike conducting member and the dead center of the decentering force which is developed in the sheetlike conducting member when only a predetermined one of the single-phase magnetizing-currents is applied to the field-element.

3. An alternating-current electro-responsive device, comprising a flat, substantially horizontally extending, sheetlike conducting member, low-inertia means supporting said sheetlike conducting member with freedom for only approximately translational motion in approximately its own plane, and for only a limited amount of such motion, a movable means mechanically associated with said sheetlike conducting member to be moved therewith, and multipolar field-member means comprising an E-shaped, tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from one face of said sheetlike conducting member, said pole-faces being alined in approximately a straight line in approximately the direction of motion of said sheetlike conducting member and covering a substantial part of the whole area of said sheetlike conducting member, said pole pieces covering a substantial part of the whole area of said sheet-like conducting member; said multipolar field-member means having alternating-current exciting-coil means for causing translational motion of said sheetlike conducting member through interaction of the field-member pole-fluxes with the eddy currents induced in said sheetlike conducting member, said exciting-coil means including exciting-coil means on the center pole-face and other exciting-coil means for causing mutually aiding flux-flow through said yoke-piece and the two outer pole-pieces, and means in the yoke-piece portion of each of said parallel return-flux paths for independently adjusting the magnetic constants thereof.

4. The invention as defined in claim 3, characterized by the arrangement being such that a gravity resetting-force is provided, for biasing the sheetlike conducting member to a predetermined position in its range of movement, in combination with stop-means for adjusting the relations between the non-energized position of the sheetlike conducting member, the gravity reset-position, and the dead center of the decentering force which is developed in the sheetlike conducting member when only a predetermined one of the single-phase magnetizing-currents is applied to the field-element.

5. An alternating-current electro-responsive device, comprising a flat, substantially horizontally extending, sheetlike conducting member, low-inertia means supporting said sheetlike conducting member with freedom for only approximately translational motion in approximately its own plane, and for only a limited amount of such motion, said supporting-means comprising at least two separate rocker-supporting members disposed transversely with respect to the direction of movement of said sheetlike conducting member, one near each end of said sheetlike conducting member, low-friction means for supporting the bottom face of the sheetlike conducting member on the tops of the two rocker-supporting members, each rocker-supporting member having two rockers underneath the same, one rocker near each end of each rocker-supporting member, and two parallel stationary rocker-supporting bars, extending parallel to the direction of movement of said sheetlike conducting member and disposed underneath said rockers, the top surfaces of said rocker-supporting bars having such configuration as to approximate a point-contact with each rocker, a movable means mechanically associated with said sheetlike conducting member to be moved therewith, and multipolar field-member means comprising an E-shaped tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from the top face of said sheetlike conducting member, said pole-faces being alined in approximately a straight line in approximately the direction of motion of said sheetlike conducting member and covering a substantial part of the whole area of said sheetlike conducting member; said multipolar field-member means having alternating-current exciting-coil means for causing translational motion of said sheetlike conducting member through interaction of the field-member pole-fluxes with the eddy currents induced in said sheetlike conducting member, said exciting-coil means including exciting-coil means on the center pole-face and other exciting-coil means for causing mutually aiding flux-flow through said yoke-piece and the two outer pole-pieces, and means in the yoke-piece portion of each of said parallel return-flux paths for independently adjusting the magnetic constants thereof.

6. An alternating-current electro-responsive device, comprising a flat, substantially horizontally extending, sheetlike conducting member, low-inertia means supporting said sheetlike conducting member with freedom for only approximately translational motion in approximately its own plane, and for only a limited amount of such motion, said supporting-means comprising a plurality of downwardly depending leaf-spring means, having flexibility in the direction of movement of said sheetlike conducting member, for movably suspending said sheetlike conducting member, a movable means mechanically associated with said sheetlike conducting member to be moved therewith, and multipolar field-member means comprising an E-shaped tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from the bottom face of said sheetlike conducting member, said pole-faces being alined in approximately a straight line in approximately the direction of motion of said sheetlike conducting member and covering a substantial part of the whole area of said sheetlike conducting member; said multipolar field-member means having alternating-current exciting-coil means for causing translational motion of said sheetlike conducting member through interaction of the field-member pole-fluxes with the eddy currents induced in said sheetlike conducting member, said exciting-coil means including exciting-coil means on the center pole-face and other exciting-coil means for causing mutually aiding flux-flow through said yoke-piece and the two outer pole-pieces, and means in the yoke-piece portion of each of said parallel return-flux paths for independently adjusting the magnetic constants thereof.

7. An alternating-current electro-responsive device, comprising a flat, sheetlike conducting member, means supporting said sheetlike conducting member with freedom for motion in approximately its own plane, an E-shaped, tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from one face of said sheetlike conducting member, said field-element having alternating-current exciting-coil means, disposed on its three pole-pieces, respectively, for moving said sheetlike conducting member through interaction of the field-member pole-fluxes with the eddy currents induced in said sheetlike conducting member, the exciting coil means on the two outer pole-pieces mutually aiding flux-flow through said yoke-piece and said two outer pole-pieces, and means in the yoke-piece portion of each of said parallel return-flux paths for independently adjusting the magnetic constants thereof.

8. An alternating-current electro-responsive device, comprising a flat, sheetlike conducting member, means supporting said sheetlike conducting member with freedom for motion in approximately its own plane, multipolar field-member means comprising an E-shaped, tripolar electromagnet field-element comprising a yoke-piece and three projecting pole-pieces, the two outer pole-pieces and the two halves of the yoke-piece constituting two parallel return-flux paths for the center-pole flux, said electromagnet having its pole-faces spaced, by an air-gap, from one face of said sheetlike conducting member, said field-element having alternating-current exciting-coil means including a current coil on the center pole-piece, and potential-coil means for causing mutually aiding flux-flow through said yoke-piece and the two outer pole-pieces, for moving said sheetlike conducting member through interaction of the field-member pole-fluxes with the eddy currents induced in said sheetlike conducting member, and means in the yoke-piece portion of each of said parallel return-flux paths for independently adjusting the magnetic constants thereof.

WILLIAM K. SONNEMANN.

REFERENCES CITED

The following references are of record in the file of this patent:

UNITED STATES PATENTS

| Number | Name | Date |
|---|---|---|
| 1,815,861 | Mayr | July 21, 1931 |
| 1,920,818 | Verral | Aug. 1, 1933 |
| 2,104,131 | Matthews | Jan. 4, 1938 |